MAGNETIC RECORDING TAPE REEL

Filed May 25, 1955 2 Sheets-Sheet 1

INVENTOR.
VICTOR A. MOHRLANT
BY
Carpenter, Abbott, Coulter & Kinney
ATTORNEYS

Jan. 24, 1961 V. A. MOHRLANT 2,969,203

MAGNETIC RECORDING TAPE REEL

Filed May 25, 1955 2 Sheets-Sheet 2

INVENTOR.
VICTOR A. MOHRLANT
BY
Carpenter, Abbott, Coulter & Kinney
ATTORNEYS

United States Patent Office 2,969,203

Patented Jan. 24, 1961

2,969,203

MAGNETIC RECORDING TAPE REEL

Victor A. Mohrlant, St. Paul, Minn., assignor to Minnesota Mining & Manufacturing Company, St. Paul, Minn., a corporation of Delaware Filed May 25, 1955, Ser. No. 510,971

2 Claims. (Cl. 242—74)

This invention relates to magnetic recording tape reels and similar reels and more particularly to means for releasably securing the end of a magnetic tape to the hub of a reel.

It is known to secure magnetic recording tape releasably to a reel by means of a thread-up stud. As heretofore used, the thread-up stud is mounted to the inside of a side face of the hub and is centrally positioned in a cavity in the hub, which cavity extends radially inwardly from a narrow paraxial slot in the rim of the hub, by paraxial being meant parallel to the rotative axis of the reel. The thread-up stud is accessible from the side of the reel opposite said side face to provide access for a loop of tape to be laid through the slot and over the stud as shown, for example, in U.S. Patent No. 2,639,867.

While this means of securing magnetic tape to a reel has been used extensively in large, professional-type recorders, the large area required by previously known thread-up studs has heretofore thwarted their utilization in dictating machines and in home recorders which are generally designed to employ reels no larger than seven inches diameter overall. The hub of a typical 7-inch reel has a diameter of 2¼ inches. The hub has a central spindle hole and a set of three drive-pin-engaging holes arranged symmetrically thereabout at a radius of about ⅝ inch. There remains within the hub only a relatively narrow rim portion wherein fastening means for the tape end may be provided without structurally weakening the reel. The provision for a pair of thread-up studs, as previously used, for fastening a tape from either side of the reel would require the side faces of the hub to be cut away in the area between the drive-pin-engaging holes and so would substantially weaken the reel. Since the ultimate cost of a reel in production is largely determined by the cost of the raw material, it is of utmost importance that the reel be designed to have maximum strength for the amount of material used. Obviously, if a structurally important part of the reel is cut away, a greater amount of material must be included elsewhere in the reel to provide the same overall strength.

It is accordingly an object of this invention to provide means for securely attaching the end of a magnetic recording tape to a reel, which means utilize only a relatively narrow rim portion of the hub of the reel. It is a further object of the invention to provide means for securely attaching the end of a magnetic tape to a reel, the provision for which does not structurally weaken the reel. It is a specific object of the invention to provide a thread-up stud for a magnetic recording tape reel which may be located between the rim of the hub and a drive-pin-engaging hole. It is a further object of this invention to provide a thread-up stud for a reel which simplifies the thread-up procedure.

Briefly this invention solves the foregoing problems by providing for a magnetic recording tape reel, a thread-up stud, the radially outer paraxial face of which forms a segment of the cylindrical rim of the hub. This allows the space required for the thread-up stud to be held to a minimum, and the amount of the side face of the hub which need be cut away to provide access to the stud is inconsequential. The rim of the hub is discontinuous and forms a narrow paraxial slot within which the thread-up stud is positioned. The stud is spaced from each edge of the slot by a distance greater than the thickness of magnetic recording tape and is accessible from the side of the reel opposite the side face of the hub by which the stud is supported. Thus a loop of the tape is easily inserted around the stud to secure the tape releasably to the reel.

The tread-up stud is elongated in the radial direction to guard against any radial movement thereof which would create either a gap or protrusion in the rim of the hub. On the other hand, considerable resilience in the transverse direction can be tolerated so that the stud may be quite narrow. With a narrow radially-elongated stud, only a narrow strip of the side face of the hub need be removed to provide adequate clearance in fastening a loop of tape to the stud, which strip is of structural insignificance.

The invention will be more fully understood in connection with the following description and the accompanying drawings in which.

Figures 1, 2, 3:
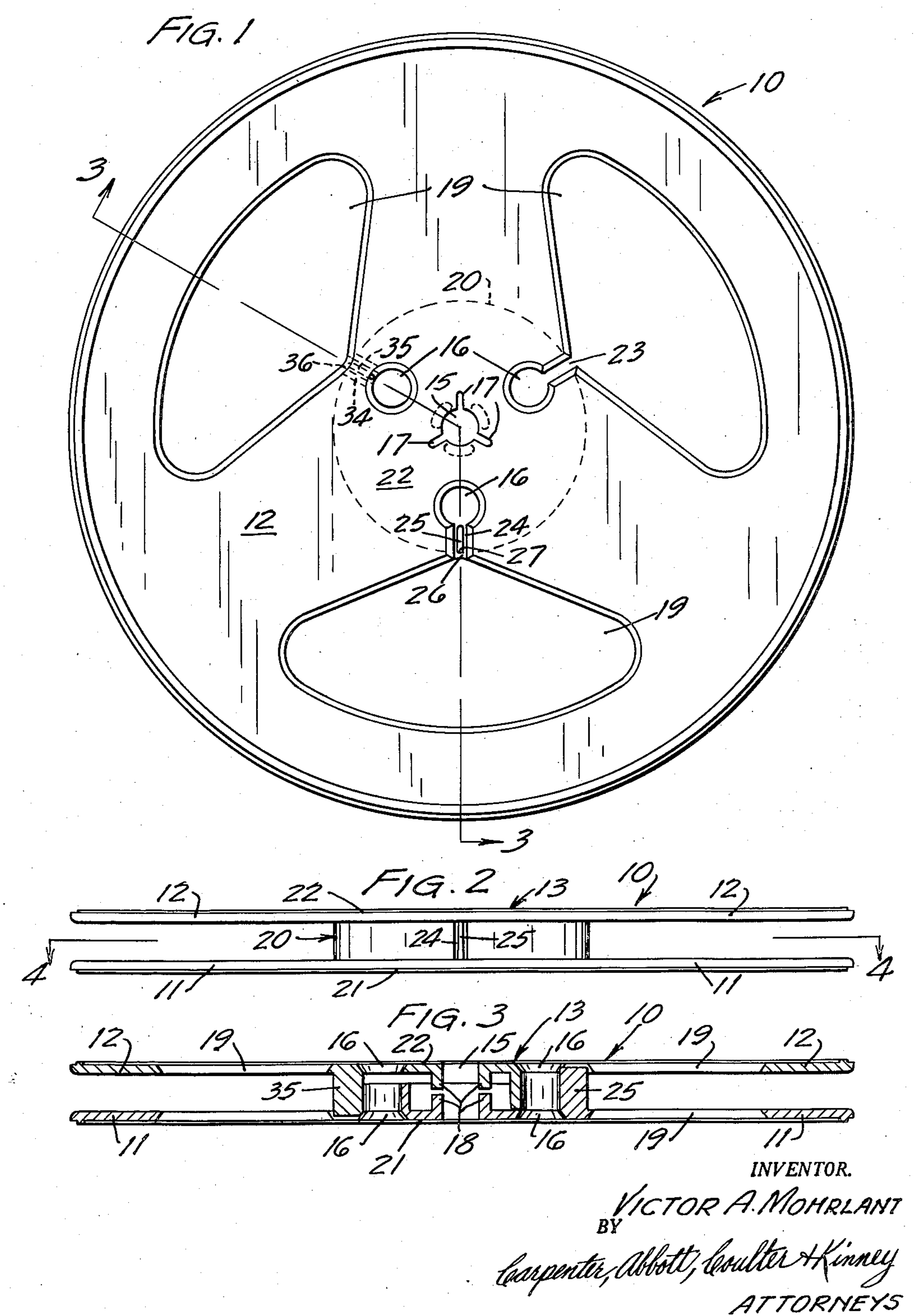
Fig. 1 is an elevational view of one side of a sound recording tape reel embodying my invention.
Fig. 2 is an end, elevational view of the reel of Fig. 1.
Fig. 3 is a cross-sectional view of the reel taken along line 3—3 of Fig. 1.

Referring now to Figs. 1–4 of the drawing which illustrate a preferred embodiment of my invention in a so-called 7-inch reel, the reference character 10 indicates generally a magnetic recording tape reel which is comprised of two thin, circular flanges 11, 12 parallel to each other and emanating from a central hub 13 which spaces the flanges 11, 12 by a slightly greater distance than the width of the tape to be wound on the hub. By the flanges is meant only that portion of the reel 10 extending beyond the hub 13 even though the reel may be formed as a one-piece molding, or as a two-piece molding, each piece of which includes one flange and a part of the hub. The hub 13 in turn may be thought of as being comprised of a cylindrical rim 20 and two side faces 21, 22 which blend into flanges 11 and 12, respectively. The hub is, as shown in Fig. 3, preferably of hollow construction to save material, and the description will proceed with regard to such, but it will be appreciated that the invention is equally applicable to a hub of solid construction.

The hub 13 is formed with a central spindle hole 15 and a set of three drive-pin-engaging holes 16 arranged symmetrically thereabout at a radius of about ⅝ inch. The drive-pin holes 16 are utilized by some tape recorders as a means for engaging the reel 10 to the drive mechanism, whereas in other recorders the reel 10 is driven by means of a spindle, projections of which mesh with the slots 17 of the spindle hole 15. Supports 18 projecting axially inwardly from hub side faces 21, 22 engage the spindle bearing surface to reduce wear at the spindle hole 15. Radially aligned with each drive-pin-engaging hole 16 is a bounded flange opening 19 extending to the rim 20 of hub 13 to provide access to that part of the rim 20 from either side of the reel 10.

Both side faces 21, 22 of hub 13 are cut away between one of drive-pin-engaging holes 16 and the flange opening 19 radially aligned therewith as indicated by reference character 23. This channel 23 has nothing to do with this invention but is illustrated in the drawing, because the apparatus utilized at the factory to thread the end of the tape to the reel in almost every case requires such a channel.

Between each of the other two pairs of drive-pin holes 16 and flange openings 19, only one of side faces 21, 22 is cut away, in each case to provide access to a thread-up stud projecting from the inner wall of the opposite side face. That is, side face 22 is cut away to form slot 24 to provide access to thread-up stud 25 which protrudes from side face 21 while a slot 34 in side face 21 makes stud 35 accessible. Stud 25 is positioned at a paraxial slot 26 in rim 20 such that its outer surface 27 forms a segment of the cylindrical surface 20 of hub 13. Slots 24 and 26 actually are a single continuous slot in hub 13 to provide clearance for a loop of magnetic recording tape along the sides of stud 25 and are equal in width. Stud 25 and slot 26 are so dimensioned circumferentially that the gaps in the hub are a good deal smaller than the .075 inch which has been found to be the maximum allowable gap in a well designed magnetic recording tape reel. So, too, is stud 35 positioned in paraxial slot 36 of rim 20 to form a segment of the cylindrical surface of hub 13, slot 36 being continuous with slot 34. It should be noted here that the broad sides of studs 25, 35 are preferably tapered from top to bottom for ease in slipping a loop of tape thereover.

Figures 4, 5, 6:
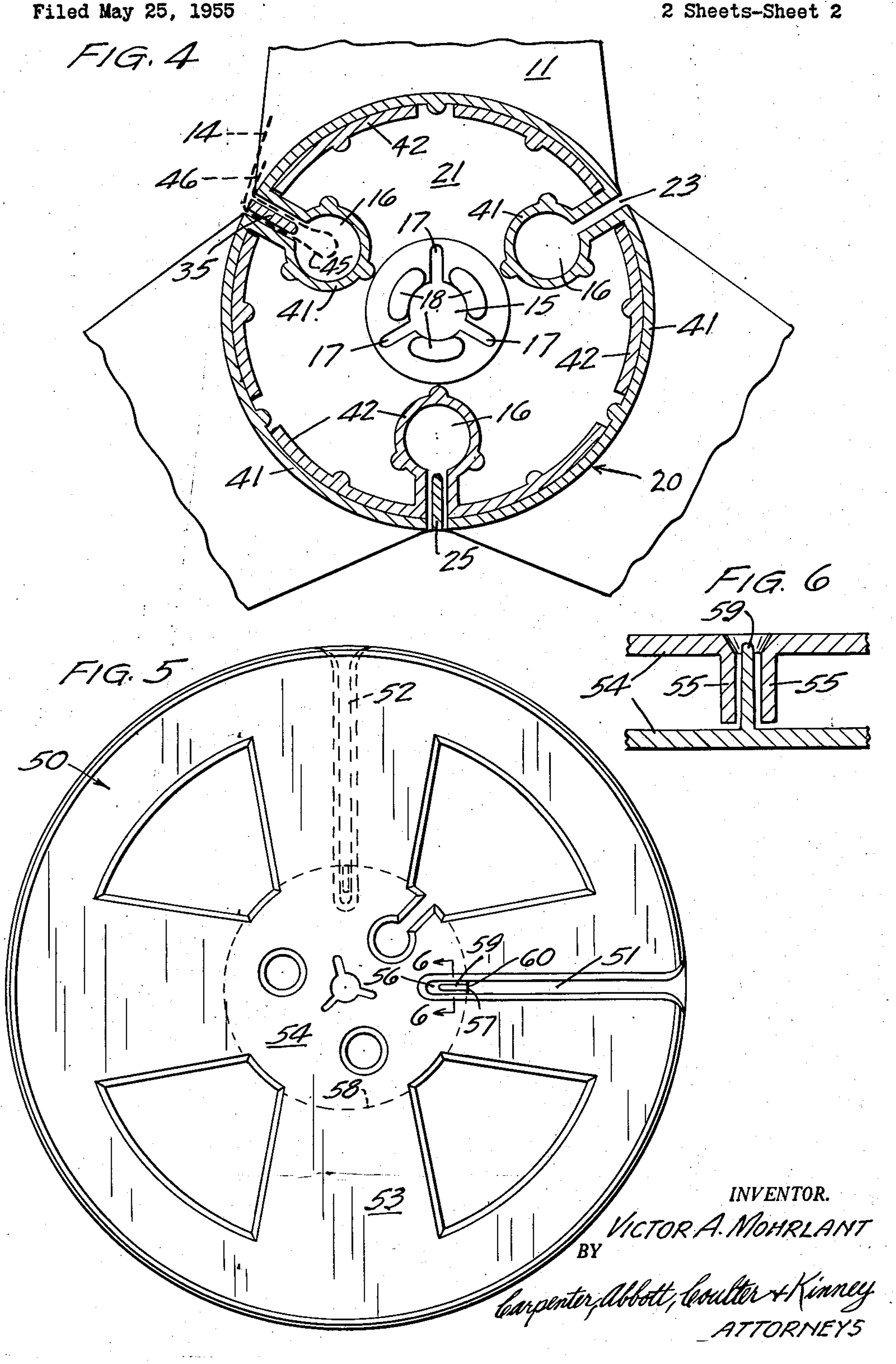
Fig. 4 is an enlarged cross-sectional view of the central portion of the reel taken along line 4—4 of Fig. 2 to illustrate the preferred manner of constructing the reel.
Fig. 5 is an elevational view of one side of a reel incorporating my invention in an alternative form.
Fig. 6 is an enlarged fragmentary sectional view along the line 6—6 of Fig. 5.

A convenient method of fabricating the reel 10 shown in Figs. 1–3 is to mold it in two sections and join the sections as illustrated in Fig. 4, which is an enlarged cross-section of the hub 13 taken along the line 4—4 of Fig. 2. One section consists of the flange 11, side face 21, and an outer hub member 41, the outer surface of which forms the rim 20 of the assembled reel. The other section consists of the flange 12 and side face 22 (not shown) and an inner hub member 42 which is designed to nest inside outer hub member 41 to provide rigidity both in the radial and circumferential directions between the two sections. The spacing between the flanges 11 and 12, however, is determined only by outer hub member 41, inner hub member 42 being somewhat shorter than outer hub member 41. Outer hub member 41 extends inwardly around channel 23 and its associated drive-pin-engaging hole 16 to provide a bearing surface against which the end of the tape may be held in the factory winding operation. Outer hub member 41 also extends inwardly along slot 34 and the drive-pin hole 16 while inner hub member 42 extends inwardly along slot 24 and its corresponding drive-pin hole 16, to define cavities in hub 13 around the thread-up studs. These extensions of the inner and outer hub members are provided largely for esthetic purposes by giving the reel a finished appearance but may offer some advantage in the thread-up operation.

The reel 10 is preferably molded of polystyrene. This material is inexpensive, dimensionally stable, and crystal clear to give both a pleasing appearance and easy observation of the tape. The polystyrene may alternatively be colored by adding the proper pigment to the molding powder. The two sections are permanently bonded together by momentarily dipping the inner hub member 42 into a suitable polystyrene solvent and then joining the sections together. Suitable solvents include acetone and methyl ethyl ketone as well as a number of commercially available solvent mixtures which are somewhat less expensive because they contain low-cost diluents.

Figure 4 also illustrates the manner in which a magnetic tape 14, shown in chain line, may be fastened to reel 10. The end of the tape is folded to form a loop 45, which is placed over stud 35. The tape is then drawn back to pull the loop tight and laid along hub 13 so that the tag end 46 of the tape is bound tightly by the portion leading to the tape supply. As shown in Fig. 4 the tape is being fastened for reel rotation in the counterclockwise direction.

While the reel 10 depicted by Figs. 1–4 illustrates a preferred embodiment of the invention in which access to the thread-up studs is obtained by means of large bounded flange openings radially aligned with the thread-up studs, another design offers greater ease in fastening the tape. The greater ease is possible because with reel 10, the end of the tape must first be fed between the flanges 11 and 12 and then grasped by the fingers through a flange opening 19. The tape is then folded and readily secured to the thread-up stud. Reference is now made to Figs. 5 and 6 which show a reel 50, to the thread-up studs of which the end of a magnetic tape can be secured without first feeding the tape past the rim. This is made possible by a pair of long, narrow apertures 51, 52, extending from the periphery of each flange 53 and into the side faces 54 of the hub of the reel 50 to allow the tape to be fastened from either side of the reel. An inner hub member 55, shown in Fig. 6, projecting from one of side faces 54 encloses the cavity 56 extending radially inwardly from the paraxial slot 57 in the hub rim 58. A thread-up stud 59 projects from the other of side faces 54 into the center of cavity 56, and is so positioned and shaped that its radially outermost surface 60 forms a segment of the hub rim 58 as shown in Fig. 5. The edges of the flanges at apertures 51, 52 are preferably beveled so that a loop of tape may be easily pushed down around the stud 59 and locked in place in the same manner as described in connection with Fig. 4 above.

In spite of the greater ease in tape threading offered by the reel illustrated in Figs. 5 and 6, it is believed that this advantage is outweighed by the loss in structural stability due to the discontinuity in the rims of the flanges 53. This disadvantage is particularly present in reels having an overall diameter of five inches or more and molded of so-called plastic materials, as opposed to a metal construction, in that plastic is to a large extent subject to deformation due to mechanical forces, temperature or humidity variations, or combinations thereof. For example, if another reel of tape were carelessly laid upon the rim of the flange of the reel 50 next to its long, narrow aperture and left there for some time, the reel might well be warped, particularly in hot weather.

What is claimed is as follows:

1. A reel adapted to have tape wound thereon and having a central hub, said hub bounded by a cylindrical rim and at least one side face, said side face being formed with drive-pin-engaging holes circularly symmetrically positioned around the rotative axis of the reel, said rim being discontinuous and forming a narrow paraxial slot connecting with one of said drive-pin-engaging holes, said hub also having a radially-elongated tongue-like stud of substantially greater radial length than the thickness of said rim, said stud being positioned within said slot and supported from the portion of said one side face between said one drive-pin-engaging hole and the hub rim and having a radially outer paraxial face forming a segment of the cylindrical rim of the hub, said hub including walls extending inwardly from said rim to provide sidewalls for said slot, said walls extending in the same general direction as and substantially parallel to the sides of said stud along the full length of the stud, said stud being spaced from each of said walls by a distance greater than the thickness of tape to be wound on said reel and accessible from the side of the reel opposite said one side face for easy insertion of a loop of the tape around the stud.

2. A reel adapted to have tape wound thereon and having a central hub bounded by a cylindrical rim and first and second side faces, each of said side faces being formed with three drive-pin-engaging holes circularly symmetrically positioned around the rotative axis of the reel, said rim being discontinuous and forming at least two narrow paraxial slots, each connecting with one of said drive-pin-engaging holes; said hub also having a first radially-elongated tongue-like stud supported from the first side face and positioned within one of said slots and a second radially-elongated tongue-like stud supported from the second side face and positioned within another of said slots, each of said studs having substantially greater radial length than the thickness of said rim and having a radially outer paraxial face forming a segment of the cylindrical rim of the hub, said hub including walls extending inwardly from said rim to provide sidewalls for each of said slots, each of said walls extending substantially parallel to the sides of one of said studs along the full length of the stud, each of said studs being spaced from said walls by a distance greater than the thickness of tape to be wound on said reel and being accessible through an opening in the side face opposite the side face from which it is supported for easy insertion of a loop of the tape around the stud.

References Cited in the file of this patent

UNITED STATES PATENTS

| | | |
|---|---|---|
| 331,956 | Ford | Dec. 8, 1885 |
| 1,498,133 | Swem et al. | June 17, 1924 |
| 2,639,867 | Lindsay | May 26, 1953 |
| 2,778,581 | Lorenz | Jan. 22, 1957 |

FOREIGN PATENTS

| | | |
|---|---|---|
| 673,012 | Germany | Mar. 14, 1939 |
| 688,033 | Germany | Feb. 10, 1940 |
| 865,070 | Germany | Jan. 29, 1953 |